United States Patent
Mei et al.

(10) Patent No.: US 12,468,113 B2
(45) Date of Patent: Nov. 11, 2025

(54) OPTICAL LENS, MANUFACTURING METHOD OF OPTICAL LENS, AND CAMERA MODULE

(71) Applicant: NINGBO SUNNY OPOTECH CO., LTD., Zhejiang (CN)

(72) Inventors: Zhewen Mei, Zhejiang (CN); Haipeng Pei, Zhejiang (CN); Takehiko Tanaka, Zhejiang (CN); Renkang Lin, Zhejiang (CN); Hui Li, Zhejiang (CN); Lei Wang, Zhejiang (CN)

(73) Assignee: NINGBO SUNNY OPOTECH CO., LTD., Zhejiang (CN)

( * ) Notice: Subject to any disclaimer, the term of this patent is extended or adjusted under 35 U.S.C. 154(b) by 845 days.

(21) Appl. No.: 17/640,526

(22) PCT Filed: Aug. 28, 2020

(86) PCT No.: PCT/CN2020/112055
§ 371 (c)(1),
(2) Date: Mar. 4, 2022

(87) PCT Pub. No.: WO2021/043079
PCT Pub. Date: Mar. 11, 2021

(65) Prior Publication Data
US 2022/0334342 A1   Oct. 20, 2022

(30) Foreign Application Priority Data

Sep. 5, 2019   (CN) .......................... 201910836853.1
Sep. 5, 2019   (CN) .......................... 201921469888.8

(51) Int. Cl.
*G02B 7/02*   (2021.01)
*G02B 1/11*   (2015.01)

(52) U.S. Cl.
CPC ................ *G02B 7/021* (2013.01); *G02B 1/11* (2013.01)

(58) Field of Classification Search
CPC .................................. G02B 7/021; G02B 1/11
See application file for complete search history.

(56) References Cited

U.S. PATENT DOCUMENTS

2017/0176705 A1   6/2017   Wang et al.

FOREIGN PATENT DOCUMENTS

| CN | 105445888 | 3/2016 |
|---|---|---|
| CN | 208432776 | 1/2019 |

(Continued)

OTHER PUBLICATIONS

International Search Report issued Dec. 2, 2020, in International (PCT) Application No. PCT/CN2020/112055, with English translation.

(Continued)

*Primary Examiner* — Bumsuk Won
*Assistant Examiner* — Grant A Gagnon
(74) *Attorney, Agent, or Firm* — Wenderoth, Lind & Ponack, L.L.P.

(57) ABSTRACT

An optical lens (1), comprising a first lens (100) and a lens assembly (110). The first lens (100) includes a first optical area (101) and a first structural area (102) surrounding the first optical area (101), and the first structure area (102) includes a height measurement area (103) not coated with an anti-reflective coating. The lens assembly (110) includes a lens barrel (104) and at least one second lens (105) disposed in the lens barrel (104). The at least one second lens (105) includes a second optical area (106) and a second structural area (107) surrounding the second optical area (106). The first structural area (102) is connected to an end face (109) of the lens barrel (104) near the first lens (100) or the second (Continued)

structural area (107) of the second lens (105) closest to the first lens (100). A manufacturing method of optical lens (1) and a camera module are also disclosed.

20 Claims, 5 Drawing Sheets

(56) References Cited

FOREIGN PATENT DOCUMENTS

| | | |
|---|---|---|
| CN | 110109226 | 8/2019 |
| CN | 210666151 | 6/2020 |
| JP | 2003-294915 | 10/2003 |
| JP | 2004-030770 | 1/2004 |
| JP | 2009-139702 | 6/2009 |

OTHER PUBLICATIONS

Extended European Search Report issued Aug. 12, 2022 in corresponding European Patent Application No. 20861769.6.

obtaining a first posture of a first lens based on a ranging beam reflected by a height measurement area of the first lens not coated with an anti-reflective coating;   10 adjusting an angle of the first lens according to the first posture, so that there is a relative inclination angle between the first lens and the lens assembly within a predetermined threshold;   20 pre-positioning the first lens, the lens assembly and a photosensitive assembly so that an image formed through the first lens and the lens assembly can be obtained on the photosensitive assembly;   30 actively aligning a relative position of the first lens and the lens assembly based on the formed image;   40 fixing the first lens to the lens assembly based on the actively aligned relative position of the first lens and the lens assembly.   50

FIG. 8

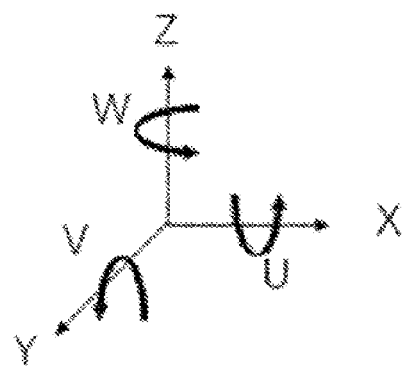

FIG. 9

OPTICAL LENS, MANUFACTURING METHOD OF OPTICAL LENS, AND CAMERA MODULE

CROSS-REFERENCE TO RELATED APPLICATIONS

The present application claims the priority and benefit of Chinese Patent Application No. 201910836853.1 filed with the China National Intellectual Property Administration (CNIPA) on Sep. 5, 2019, and Chinese Patent Application No. 201921469888.8 filed with CNIPA on Sep. 5, 2019, which are incorporated herein by reference in their entirety.

TECHNICAL FIELD

The present application relates to the field of optical elements, and more specifically, to an optical lens, a manufacturing method of optical lens, and a camera module.

TECHNICAL BACKGROUND

A split type optical lens generally includes a plurality of lens assemblies. Each assembly includes at least one lens. In the process of manufacturing the split type optical lens, it is necessary to repeatedly correct a relative position between the lens assemblies through an active alignment process. In this process, the posture or position measurement of the lens assembly is an important step.

SUMMARY

An aspect of the present application provides an optical lens, comprising: a first lens including a first optical area and a first structural area surrounding the first optical area, the first structural area including a height measurement area not coated with an anti-reflective coating; and a lens assembly including a lens barrel and at least one second lens disposed in the lens barrel, wherein the at least one second lens includes a second optical area and a second structural area surrounding the second optical area, and the first structural area is connected to an end face of the lens barrel near the first lens or the second structural area of the second lens closest to the first lens.

In an implementation, the height measurement area is an annular planar area.

In an implementation, a length of the annular planar area in an axial direction of the first lens is 0.2 mm or more.

In an implementation, the height measurement area includes at least three sections of planar area spaced apart from each other.

In an implementation, a length of the planar area in an axial direction of the first lens is 0.2 mm or more, and a length of the planar area along a peripheral direction of the first lens is 0.5 mm or more.

In an implementation, the height measurement area is coated with a reflective coating.

In an implementation, the height measurement area is located on a side of the first lens facing away from the lens assembly.

In an implementation, the height measurement area is located on a side of the first lens close to the lens assembly.

In an implementation, a roughness of the height measurement area is smaller than a roughness of other areas of the first structural area.

In an implementation, the height measurement area is located at an outer edge of the first lens.

Another aspect of the present application provides a manufacturing method of an optical lens, comprising: obtaining a first posture of a first lens based on a ranging beam reflected by a height measurement area of the first lens not coated with an anti-reflective coating; adjusting an angle of the first lens according to the first posture, so that there is a relative inclination angle between the first lens and the lens assembly within a predetermined threshold; pre-positioning the first lens, the lens assembly and a photosensitive assembly so that an image formed through the first lens and the lens assembly can be obtained on the photosensitive assembly; actively aligning a relative position of the first lens and the lens assembly based on the formed image; and fixing the first lens to the lens assembly based on the actively aligned relative position of the first lens and the lens assembly.

In an implementation, a length of the annular planar area in an axial direction of the first lens is 0.2 mm or more.

In an implementation, the height measurement area includes at least three sections of planar area spaced apart from each other.

In an implementation, a length of the planar area in an axial direction of the first lens is 0.2 mm or more, and a length of the planar area along a peripheral direction of the first lens is 0.5 mm or more.

In an implementation, a roughness of the height measurement area is smaller than a roughness of adjacent areas of the height measurement area.

In an implementation, said adjusting the angle of the first lens according to the first posture comprises: obtaining a second posture of the lens assembly based on the ranging beam reflected by the lens assembly; and adjusting the angle of the first lens according to the first posture and the second posture, so that there is a relative inclination angle between the first lens and the lens assembly within the predetermined threshold.

In an implementation, the manufacturing method further comprises: coating a reflective coating in the height measurement area.

In an implementation, the first lens includes a first optical area and a first structural area surrounding the first optical area, the first structural area includes the height measurement area, and the manufacturing method further comprises: by controlling an evaporation angle of an evaporation source, coating the anti-reflective coating only in the first optical area and a part of the first structural area other than the height measurement area.

In an implementation, the first lens includes a first optical area and a first structural area surrounding the first optical area, the first structural area includes the height measurement area, and the manufacturing method further comprises: by disposing a mask between the height measurement area and an evaporation source, coating the anti-reflective coating only in the first optical area and a part of the first structural area other than the height measurement area.

In an implementation, the predetermined threshold may be 0.1 degrees.

Still another aspect of the present application provides a camera module, comprising: the optical lens provided in the above implementation; a lens holder to which the optical lens is fixed, the lens holder including an opening aligned with a lens of the optical lens; a filter fixed to the opening; a substrate to which the lens holder is fixed; and a photosensitive component fixed on the substrate and enclosed by the lens holder and the filter.

The optical lens provided by the present application comprises a first lens and a lens assembly connected thereto. During the manufacturing process of the optical lens, the first posture of the first lens is obtained based on the ranging beam reflected by the height measurement area of the first structural area of the first lens that is not coated with the anti-reflective coating. The angle of the first lens can be adjusted according to the first posture, so that there is a relatively small relative inclination angle between the first lens and the lens assembly, so as to facilitate pre-positioning and active alignment in subsequent optical lens manufacturing, thereby improving the yield and efficiency of lens production.

BRIEF DESCRIPTION OF THE DRAWINGS

Other features, objectives, and advantages of the present application will become more apparent from a detailed description of non-restrictive implementations made with reference to the following drawings. In the drawings:

FIG. 8 is a flowchart showing a method of manufacturing an optical lens according to an embodiment of the present application;

FIG. 9 is a schematic view showing an adjustment direction of a first lens relative to a lens assembly during active alignment provided in an embodiment of the present application;

DETAILED DESCRIPTION OF THE EMBODIMENTS

Figure 1:
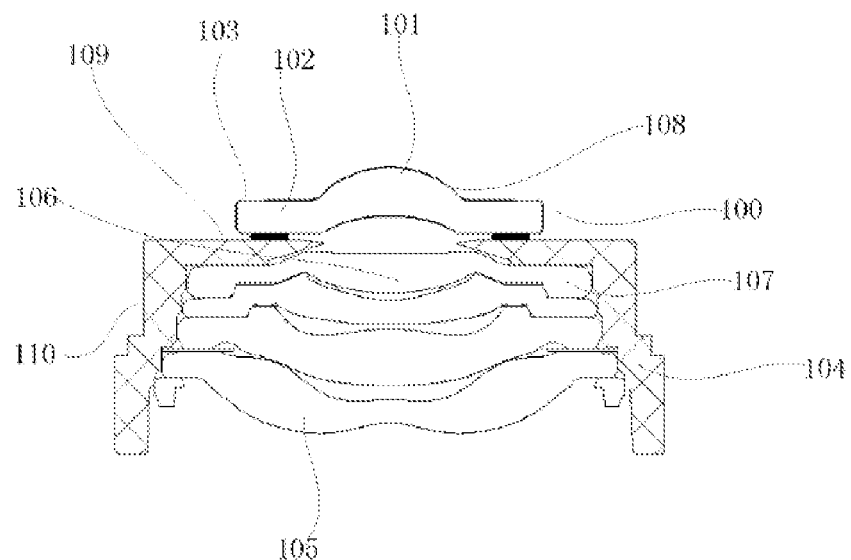
FIG. 1 is a schematic view showing a cross-sectional structure of an optical lens according to an embodiment of the present application.

In order to better understand the present application, various aspects of the present application will be described in more detail with reference to the drawings. It should be understood that the detailed description is merely description of exemplary implementations of the present application, and does not limit the scope of the present application in any way. Throughout the description, the same reference numerals refer to the same elements. The expression "and/or" includes any and all combinations of one or more of the associated listed items.

It should be noted that in the present description, the expressions of "first", "second", "third" etc. are only used to distinguish one feature from another feature, and do not indicate any limitation on the feature.

It should also be understood that the terms "comprising", "comprise", "having", "including" and/or "include" when used in the present description, indicate the existence of stated features, elements and/or components, but does not exclude the presence or addition of one or more other features, elements, components and/or combinations thereof. Furthermore, when an expression such as "at least one of" appears after a list of listed features, it modifies the entire list of features, rather than individual elements in the list. In addition, when an implementation of the present application is described, "may" is used to indicate "one or more implementations of the present application". Also, the term "exemplary" is intended to refer to an example or illustration.

Unless otherwise defined, all terms (including technical and scientific terms) used herein have the same meanings as commonly understood by those of ordinary skill in the art to which the present application belongs. It should also be understood that the terms (such as those defined in commonly used dictionaries) should be interpreted to have meanings consistent with their meaning in the context of the relevant art and will not be interpreted in an idealized or overly formal sense unless it is clearly defined herein.

It needs to be noted that, in the case of no conflict, the embodiments in the present application and the features in the embodiments may be combined with each other. The present application will be described in detail below in conjunction with embodiments with reference to the drawings.

The features, principles and other aspects of the present application will be described in detail below.

The present application provides an optical lens having high imaging quality with accurate posture adjustment and alignment between a lens and a lens assembly. Its specific structure will be described in detail in the following embodiments.

FIG. 1 is a schematic view showing a cross-sectional structure of an optical lens according to an embodiment of the present application. As shown in FIG. 1, the optical lens of the present application includes a first lens 100 and a lens assembly 110 connected to the first lens 100. The first lens 100 includes a first optical area 101 and a first structural area 102 surrounding the first optical area 101, and the first structural area 102 includes a height measurement area 103 not coated with an anti-reflective coating. In this embodiment, the first optical area 101 and an area of the first structural area 102 other than the height measurement area 103 may be coated with an anti-reflective coating 108 to improve the transmittance of the first lens 100 to light. The height measurement area 103 is not coated with an anti-reflective coating, which may enable the first lens 100 to better reflect the ranging beam in the height measurement area 103, so as to help obtain a more accurate inclined posture of the first lens 100, i.e., a first posture of the first lens 100.

Figure 7:
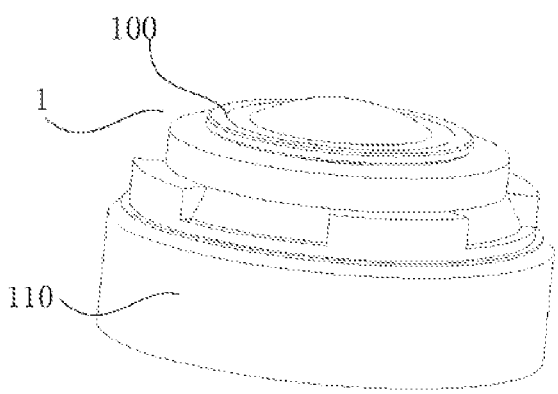
FIG. 7 is a schematic view showing an overall structure of an optical lens according to an embodiment of the present application.

The lens assembly 110 includes a lens barrel 104 and at least one second lens 105 disposed in the lens barrel 104. The at least one second lens 105 includes a second optical area 106 and a second structural area 107 surrounding the second optical area 106. In this embodiment, the first structural area 102 is connected to an end surface 109 of the lens barrel 104 close to the first lens 100. In the process of manufacturing the optical lens provided by the present application, the angle of the first lens 100 can be adjusted according to the obtained first posture, so that there is a relative inclination angle between the first lens 100 and the lens assembly within a predetermined threshold, so as to facilitate pre-positioning and active alignment during the subsequent manufacture of the optical lens, thereby improving the yield and efficiency of lens production. The predetermined threshold may be 0.1 degrees (°). In addition, the predetermined threshold may be selected to be 0.03 degrees or 0.01 degrees according to the requirements for precision and tolerance. FIG. 7 is a schematic view illustrating an overall structure of an optical lens according to an embodiment of the present application. As shown in FIG. 7, the first lens 100 of the optical lens 1 is connected to the lens assembly 110.

Figure 2:
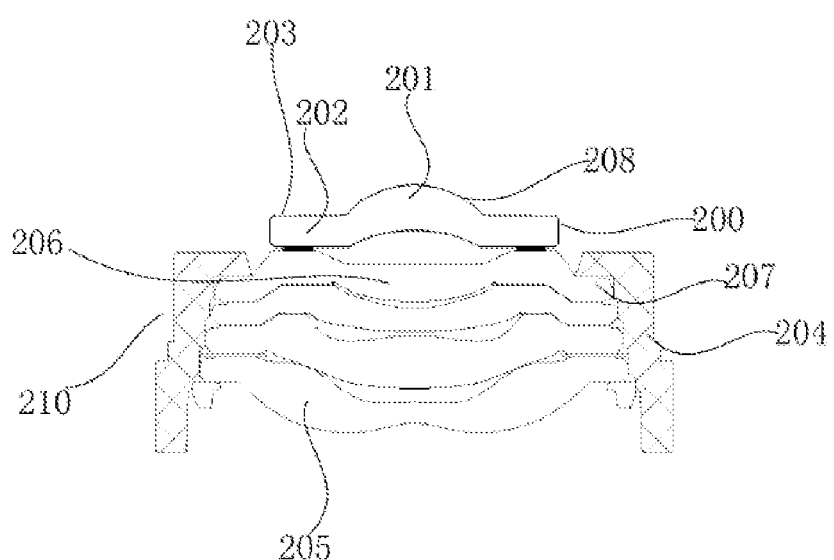
FIG. 2 is a schematic view showing a cross-sectional structure of an optical lens according to another embodiment of the present application.

FIG. 2 is a schematic view showing a structure of an optical lens according to another embodiment of the present application. As shown in FIG. 2, the optical lens of the present application includes a first lens 200 and a lens assembly 210 connected to the first lens 200. The first lens 200 includes a first optical area 201 and a first structural area 202 surrounding the first optical area 201, and the first structural area 202 includes a height measurement area 203 not coated with an anti-reflective coating. In this embodiment, the first optical area 201 and an area of the first structural area 202 other than the height measurement area 203 may be coated with an anti-reflective coating 208 to improve the transmittance of the first lens 200 to light. The height measurement area 203 is not coated with an anti-reflective coating, which may enable the first lens 200 to better reflect the ranging beam in the height measurement area 203, so as to help obtain a more accurate inclined posture of the first lens 200, i.e., a first posture of the first lens 200.

The lens assembly 210 includes a lens barrel 204 and at least one second lens 205 disposed in the lens barrel 204. The at least one second lens 205 includes a second optical area 206 and a second structural area 207 surrounding the second optical area 206. In this embodiment, the first structural area 202 is connected to the second structural area 207 of the second lens 205 of the lens barrel 204 that is closest to the first lens 200. In the process of manufacturing the optical lens provided by the present application, the angle of the first lens 200 can be adjusted according to the obtained first posture, so that there is a relative inclination angle between the first lens 200 and the lens assembly within a predetermined threshold, so as to facilitate pre-positioning and active alignment during the subsequent manufacture of the optical lens, thereby improving the yield and efficiency of lens production. The predetermined threshold may be 0.1 degrees (°). In addition, the predetermined threshold may be selected to be 0.03 degrees or 0.01 degrees according to the requirements for precision and tolerance. Meanwhile, in this embodiment, the first structural area 202 is connected to the second structural area 207 of the second lens 205 of the lens barrel 204 that is closest to the first lens 200, which can reduce the influence of the end face of the lens barrel 204 close to the first lens 100 on the assembly process of the split type optical lens.

In the present application, if the height measurement area is coated with an anti-reflective coating, the light beam received by the distance measuring device at the same position will be reduced, resulting in inaccurate detection of the tilt posture of the lens. Therefore, in the present application, no anti-reflective coating is coated on the height measurement area.

Figure 3:
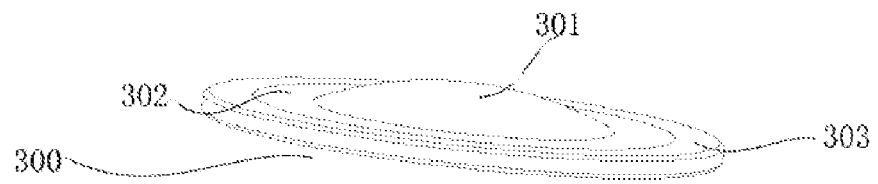
FIG. 3 is a schematic view showing a structure of a first lens according to an embodiment of the present application.
Figure 4:
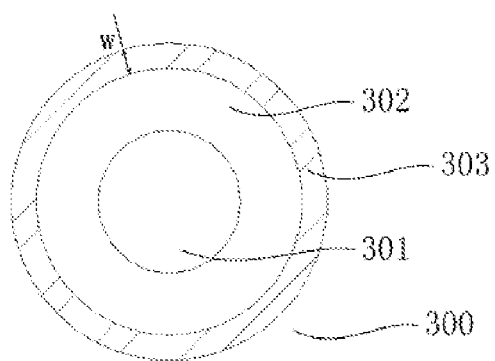
FIG. 4 is a schematic plan view showing a first lens according to an embodiment of the present application.

FIG. 3 is a schematic view showing a structure of a first lens according to an embodiment of the present application. FIG. 4 is a schematic plan view showing a first lens according to an embodiment of the present application. As shown in FIGS. 3 and 4, the first structural area 302 of the first lens 300 is formed around the first optical area 301. The height measurement area 303 is located in the first structural area 302 and may be an annular planar area. In this embodiment, the height measurement area 303 being the annular planar area can ensure that the first lens 300 has a suitable light beam emission angle and emission position at any inclined posture in actual operation, so that the height measurement area 303 can reflect the ranging beam, thereby obtaining the first posture of the first lens 300. The length w of the annular planar area in the axial direction of the first lens 300 is 0.2 mm or more. Appropriately increasing the light beam reflection area of the height measurement area 303 can improve the reflection probability of the ranging beam and increase the reflection amount. In this embodiment, there may be a large distance between the reflection points of the ranging beam in the height measurement area, so as to improve the detection accuracy of the inclined posture of the first lens 300, facilitating the improvement of the overall manufacturing efficiency of the optical lens with multiple lens assemblies.

Figure 5:
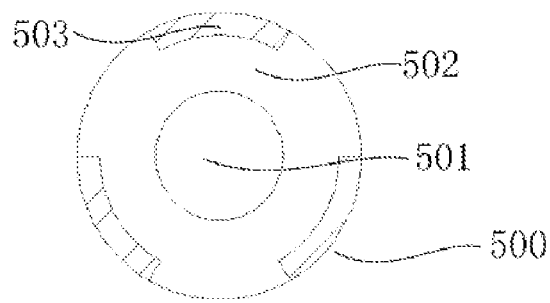
FIG. 5 is a schematic plan view showing a first lens according to another embodiment of the present application.
Figure 6:
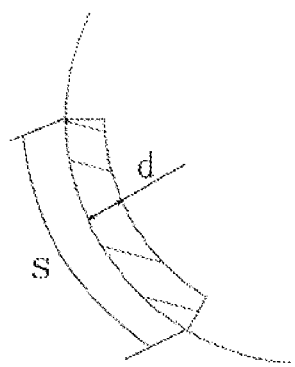
FIG. 6 is an enlarged schematic partial plan view showing a first lens according to another embodiment of the present application.

FIG. 5 is a schematic plan view showing a first lens according to another embodiment of the present application. As shown in FIG. 5, the first structural area 502 of the first lens 500 is formed around the first optical area 501. The height measurement area 503 is located in the first structural area 502, and the height measurement area 503 includes at least three sections of planar area spaced apart from each other. The height measurement area 503 is illustrated in FIG. 5 with the example of three sections of planar area spaced apart from each other. However, it can be understood by those skilled in the art that the number of height measurement areas 503 is not limited to this. FIG. 6 is an enlarged schematic partial plan view showing a first lens according to another embodiment of the present application. As shown in FIG. 6, the length d of the planar area in the axial direction of the first lens 500 is 0.2 mm or more, and the length s of the planar area along the peripheral direction of the first lens 500 is 0.5 mm or more. In this embodiment, after the ranging beam is emitted to the height measurement area 503, ranging beams reflected from multiple sections of planar area spaced apart from each other can be obtained, and the inclined posture of the first lens 500 can be accurately determined by three base points that can form a triangular area in multiple measurement positions. The larger planar area of the height measuring area can measure multiple positions, and can effectively improve the reflectivity of the beam.

The height measurement area can be coated with a reflective coating to further improve the reflectivity of the height measurement area to the ranging beam, so that the ranging device can obtain enough light beams and more accurately calculate the inclined posture and spatial position of the first lens.

The height measurement area may be located on a side of the first lens facing away from the lens assembly. For example, when the first lens is between the ranging device and the lens assembly, the height measurement area is located on the side of the first lens facing away from the lens assembly.

The height measurement area is located on the side of first lens close to the lens assembly. For example, when the lens assembly is between the first lens and the ranging device, the height measurement area is located on the side of the first lens close to the lens assembly.

A roughness of the height measurement area may be smaller than a roughness of other areas of the first structural area. The roughness of the height measurement area being too large will reduce the light beam received by the ranging device at the same position, resulting in inaccurate detection of the inclined posture of the lens. In this embodiment, the height measurement area is relatively smooth and has a smaller roughness, which is advantageous to obtain the inclined posture of the first lens more accurately. The height measurement area may be a planar area, and the planar area may be perpendicular to the central axis of the first lens.

The height measurement area may be located at the outer edge of the first lens. Based on the coating process of the anti-reflective coating, it is easier to avoid the anti-reflective coating if the height measurement area is located at the outer edge of the first lens.

The present application further provides a method of manufacturing an optical lens. FIG. 8 is a flowchart showing a method of manufacturing an optical lens according to an embodiment of the present application. As shown in FIG. 8, the manufacturing method comprises the following steps.

Step 10: Obtain a first posture of a first lens based on a ranging beam reflected by a height measurement area of the first lens not coated with an anti-reflective coating.

Step 20: Adjust an angle of the first lens according to first posture, so that there is a relative inclination angle between first lens and the lens assembly within a predetermined threshold.

Step 30: Pre-position the first lens, the lens assembly and a photosensitive assembly, so that an image formed through first lens and lens assembly can be obtained on the photosensitive assembly.

Step 40: Actively align a relative position of the first lens and the lens assembly based on the formed image.

Step 50: Fix the first lens to the lens assembly based on the actively aligned relative position of the first lens and the lens assembly.

The predetermined threshold may be 0.1 degrees. In addition, the predetermined threshold may be selected to be 0.03 degrees or 0.01 degrees according to the requirements for precision and tolerance.

The manufacturing method of optical lens provided by the present application is used for the manufacture of a split type optical lens. In this embodiment, the manufacturing method may be used for the manufacture of a split type optical lens with a single lens and a lens assembly. Compared with the area coated with an anti-reflective coating, the height measurement area not coated with an anti-reflective coating can reflect more ranging beams to ensure that the ranging device can receive enough ranging beams to obtain the inclined posture of the first lens more accurately. In the pre-positioning of step 30, if the degree of inclination of the first lens relative to the lens assembly is relatively large, or the inclination angle between the first lens and the lens assembly is greater than a certain threshold, when the first lens, the lens assembly and the photosensitive assembly are arranged along an optical axis, it is difficult for the optical lens with multiple lens assemblies to form imaging normally. At the same time, this may also result in that the imaging quality of the photosensitive assembly in step 30 is too low, and in step 40, it is difficult to determine the adjustment amount of the first lens that needs to be adjusted relative to the lens assembly. Therefore, in this embodiment, the angle of the first lens is adjusted more accurately according to the obtained first posture, so that the relative inclination angle between the first lens and the lens assembly is within a predetermined threshold. This not only facilitates the imaging of light through the first lens and the lens assembly in the subsequent pre-positioning step of lens manufacturing, but also facilitates improving the adjustment efficiency of the relative inclination angle between the first lens and the lens assembly during the lens manufacturing process.

In an exemplary implementation, the angle of the first lens can be adjusted more accurately according to the obtained accurate first posture, so that the relative inclination angle between the first lens and the lens assembly may preferably be within 0.03 degrees, so as to better perform subsequent optical lens manufacturing. Further, the relative inclination angle between the first lens and the lens assembly may also preferably be within 0.01 degrees.

In an exemplary implementation, actively aligning the relative position of the first lens and the lens assembly based on the formed image comprising: the photosensitive assembly being powered on to obtain images formed by multiple groups of lenses, and obtaining the imaging quality of the split type optical lens and its adjustment amount through an image algorithm such as SFR and MTF. FIG. 9 is a schematic view showing the adjustment direction of the first lens relative to the lens assembly during active alignment according to an embodiment of the present application. According to the adjustment amount, as shown in FIG. 9, the relative inclination angle of the first lens relative to the lens assembly may be adjusted along any axial direction of x, y, and z axes, any direction perpendicular to the x, y, and z axes, or any rotation direction around the x, y, and z axes, or the relative inclination angle of the first lens relative to the lens assembly may be adjusted according to a possible combination of the above adjustment directions, wherein u, v, and w correspond to the rotation directions of x, y, and z axes, respectively. During the adjustment process, in order to improve the efficiency, the imaging quality of the optical lens can be observed in real time, including optical parameters such as peak value, field curvature, astigmatism, etc. According to a deviation between an observed value of a relevant optical parameter obtained during the adjustment process and a target value, the relative inclination angle of the first lens relative to the lens assembly is further adjusted according to the above degrees of freedom for many times until the imaging quality of the optical lens meets the requirements.

In an exemplary implementation, it also includes disposing an adhesive on the lens assembly. After step 20, or after step 40, an adhesive is disposed on the lens assembly. The adhesive may be disposed on the end face of the lens barrel of the lens assembly close to the first lens, or may also be disposed on the second structural area of the second lens closest to the first lens. The adhesive may include a photocurable adhesive. The adhesive is cured by at least one of visible light, ultraviolet light, or baking.

In an exemplary implementation, the height measurement area is an annular planar area, and the length of the annular planar area in the axial direction of the first lens is 0.2 mm or more. The height measurement area being the annular planar area can ensure that the first lens has a suitable light beam emission angle and emission position at any inclined posture in actual operation, so that the height measurement area can reflect the ranging beam, so as to obtain the first posture of the first lens. The length of the annular planar area in the axial direction of the first lens is 0.2 mm or more. Appropriately increasing the light beam reflection area of the height measurement area can improve the reflection probability of the ranging beam and increase the reflection amount, so as to improve the measurement accuracy of the inclined posture of the first lens, facilitating the improvement of the manufacturing efficiency of the optical lens with multiple lens assemblies.

In an exemplary implementation, the height measurement area includes at least three sections of planar area spaced apart from each other. After the ranging beam is emitted to the height measurement area, ranging beams reflected from multiple sections of planar area spaced apart from each other can be obtained, and the inclined posture of the first lens can be more accurately determined through three base points that can form a triangular area in the multiple measurement positions.

In an exemplary implementation, the length of the planar area in the axial direction of the first lens is 0.2 mm or more, and the length of planar area along the peripheral direction of the first lens is 0.5 mm or more. A planar area with a suitable size helps to increase the reflection amount of the ranging beam and obtain a more accurate inclined posture of the first lens.

In an exemplary implementation, the roughness of the height measurement area is smaller than the roughness of adjacent areas of the height measurement area. The roughness of the light beam reflection area being too large will reduce the light beam received by the ranging device at the same position, resulting in inaccurate detection of the inclined posture of the lens. In this embodiment, the height measurement area is relatively smooth and has a smaller roughness, which is advantageous to obtain the more accurate inclined posture of the first lens. The height measurement area is a planar area, and the planar area is perpendicular to the central axis of the first lens.

In an exemplary implementation, adjusting the angle of the first lens according to the first posture comprises: obtaining a second posture of the lens assembly based on the ranging beam reflected by the lens assembly; and adjusting the angle of the first lens according to the first posture and the second posture, so that there is a relative inclination angle between the first lens and the lens assembly within a predetermined threshold. In this embodiment, there may be one or two ranging devices for detecting the first posture of the lens or the second posture of the lens assembly. The first posture of the lens and the second posture of the lens assembly may be detected simultaneously, or may be detected successively. According to the first posture and the second posture, the relative inclination angle between the first lens and the lens assembly can be adjusted more accurately.

In an exemplary implementation, the manufacturing method further comprises coating a reflective coating in the height measurement area, so as to further improve the reflectivity of the height measurement area to the ranging beam.

Figure 10:
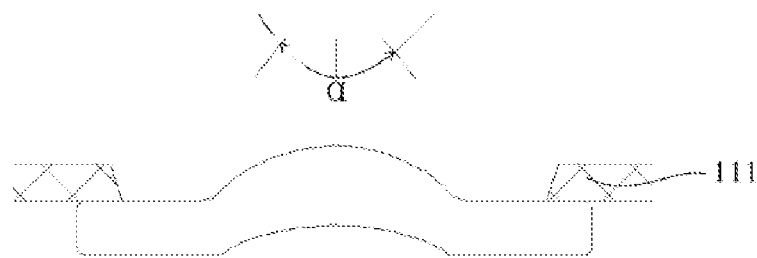
FIG. 10 is a schematic view showing a method of coating on a first lens provided in an embodiment of the present application.

In an exemplary implementation, the first lens includes a first optical area and a first structural area surrounding the first optical area, the first structural area includes a height measurement area, and the manufacturing method further comprises: by controlling an evaporation angle of an evaporation source, coating the anti-reflective coating only in the first optical area and a part of the first structural area other than the height measurement area. FIG. 10 is a schematic view showing a method of coating a film on a first lens provided in an embodiment of the present application. As shown in FIG. 10, by controlling the evaporation angle α of the evaporation source, the anti-reflective coating is directly coated on the first lens. Since the evaporation angle α is controlled, an area with a width of at least 0.2 mm in the axial direction, which is not coated with an anti-reflective coating, can be reserved on the edge of the lens. The area not coated with an anti-reflective coating is used as the height measurement area of the first lens.

In an exemplary implementation, the first lens includes a first optical area and a first structural area surrounding the first optical area, the first structural area includes a height measurement area, and the manufacturing method further comprises: by disposing a mask between the height measurement area and the evaporation source, coating the anti-reflective coating only in the first optical area and a part of the first structural area other than the height measurement area. As shown in FIG. 10, a jig or another shielding object is used as a mask 111 (such as photoresist) to shield the height measurement area of the first lens, and then the first optical area and the part of the first structural area other than the height measurement area of the first lens are coated with an anti-reflective coating. After coating is complete, the shielding object is removed. By using the jig to shield the height measurement area, the first lens with the height measurement area can be obtained more conveniently.

In the present application, the first posture of the first lens may be obtained by a pulsed laser ranging method, a phased laser ranging method or a triangular laser ranging method.

Figure 11:
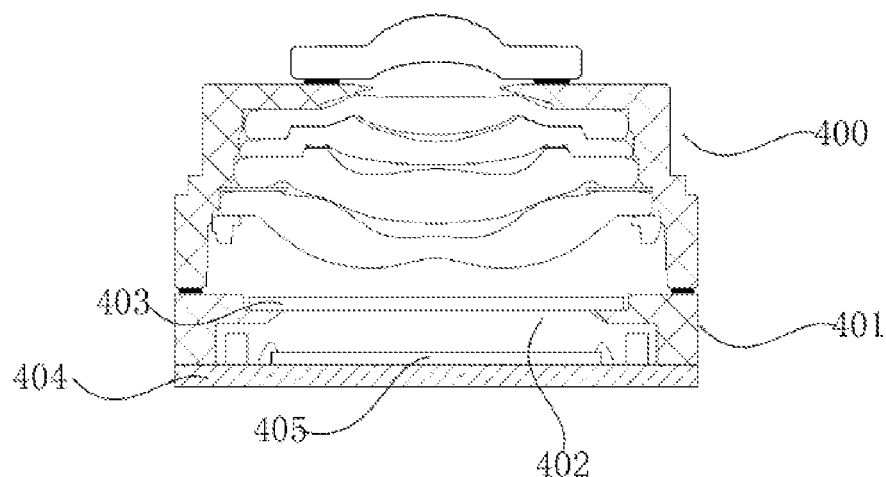
FIG. 11 is a schematic view showing a structure of a camera module according to an embodiment of the present application.

The present application further provides a camera module. FIG. 11 is a schematic view showing a structure of a camera module according to an embodiment of the present application. As shown in FIG. 11, the camera module includes an optical lens 400, a lens holder 401, a filter 403, a substrate 404 and a photosensitive component 405 provided in the above embodiment. The optical lens 400 is fixed to the lens holder 401, and the lens holder 401 includes an opening 402 aligned with a lens of the optical lens 400. The filter 403 is fixed to the opening 402, and the lens holder 401 is fixed to the substrate 404. The photosensitive component 405 is fixed on the substrate 404 and is enclosed by the lens holder 401 and the filter 403, so as to obtain a camera module having a single lens and a lens assembly combined. In the present application, there may be a non-zero included angle between the central axis of the first lens and the central axis of the lens assembly in the manufactured optical lens or camera module.

The above description is only the preferred embodiments of the present application and the explanation of the applied technical principle. It should be understood by those skilled in the art that the scope of disclosure involved in the present application is not limited to technical solutions formed by specific combinations of the above technical features, and at the same time, should also cover other technical solutions formed by any combination of the above technical features or equivalent features thereof without departing from the concept of the disclosure. For example, the above features and (but not limited to) the technical features with similar functions disclosed in the present application are replaced with each other to form technical solutions.

The invention claimed is:

1. An optical lens, wherein the optical lens comprises:
a first lens, including a first optical area and a first structural area surrounding the first optical area, wherein the first structural area includes a height measurement area not coated with an anti-reflective coating, and the height measurement area and an area of the first structural area at an inner side of the height measurement area constitute a planar area together; and
a lens assembly, including a lens barrel and at least one second lens disposed in the lens barrel, wherein the at least one second lens includes a second optical area and a second structural area surrounding the second optical area, wherein the first structural area is connected to an end face of the lens barrel near the first lens or the second structural area of the second lens closest to the first lens.

2. The optical lens according to claim 1, wherein the height measurement area is an annular planar area.

3. The optical lens according to claim 2, wherein a length of the annular planar area in an axial direction of the first lens is 0.2 mm or more.

4. The optical lens according to claim 1, wherein the height measurement area includes at least three sections of planar area spaced apart from each other.

5. The optical lens according to claim 4, wherein a length of the planar area in an axial direction of the first lens is 0.2 mm or more, and a length of the planar area along a peripheral direction of the first lens is 0.5 mm or more.

6. The optical lens according to claim 1, wherein the height measurement area is coated with a reflective coating.

7. The optical lens according to claim 1, wherein the height measurement area is located on a side of the first lens facing away from the lens assembly.

8. The optical lens according to claim 1, wherein the height measurement area is located on a side of the first lens close to the lens assembly.

9. The optical lens according to claim 1, wherein a roughness of the height measurement area is smaller than a roughness of other areas of the first structural area.

10. The optical lens according to claim 1, wherein the height measurement area is located at an outer edge of the first lens.

11. A manufacturing method of an optical lens, wherein the manufacturing method comprises:
    obtaining a first posture of a first lens based on a ranging beam reflected by a height measurement area of the first lens not coated with an anti-reflective coating, wherein the first lens includes a first optical area and a first structural area surrounding the first optical area, and the first structural area includes the height measurement area, and the height measurement area and an area of the first structural area at an inner side of the height measurement area constitute a planar area together;
    adjusting an angle of the first lens according to the first posture, so that there is a relative inclination angle between the first lens and the lens assembly within a predetermined threshold;
    pre-positioning the first lens, the lens assembly and a photosensitive assembly so that an image formed through the first lens and the lens assembly can be obtained on the photosensitive assembly;
    actively aligning a relative position of the first lens and the lens assembly based on the formed image; and
    fixing the first lens to the lens assembly based on the actively aligned relative position of the first lens and the lens assembly.

12. The manufacturing method according to claim 11, wherein the height measurement area is an annular planar area, and a length of the annular planar area in an axial direction of the first lens is 0.2 mm or more.

13. The manufacturing method according to claim 11, wherein the height measurement area includes at least three sections of planar area spaced apart from each other.

14. The manufacturing method according to claim 13, wherein a length of the planar area in an axial direction of the first lens is 0.2 mm or more, and a length of the planar area along a peripheral direction of the first lens is 0.5 mm or more.

15. The manufacturing method according to claim 11, wherein a roughness of the height measurement area is smaller than a roughness of adjacent areas of the height measurement area.

16. The manufacturing method according to claim 11, wherein said adjusting the angle of the first lens according to the first posture comprises:
    obtaining a second posture of the lens assembly based on the ranging beam reflected by the lens assembly; and
    adjusting the angle of the first lens according to the first posture and the second posture, so that there is a relative inclination angle between the first lens and the lens assembly within the predetermined threshold.

17. The manufacturing method according to claim 11, wherein the manufacturing method further comprises:
    coating a reflective coating in the height measurement area.

18. The manufacturing method according to claim 11, wherein the manufacturing method further comprises:
    by controlling an evaporation angle of an evaporation source, coating the anti-reflective coating only in the first optical area and a part of the first structural area other than the height measurement area.

19. The manufacturing method according to claim 11, wherein the manufacturing method further comprises:
    by disposing a mask between the height measurement area and an evaporation source, coating the anti-reflective coating only in the first optical area and a part of the first structural area other than the height measurement area.

20. A camera module, wherein the camera module comprises:
    the optical lens according to claim 1;
    a lens holder, to which the optical lens is fixed, wherein the lens holder includes an opening aligned with a lens of the optical lens;
    a filter fixed to the opening;
    a substrate, to which the lens holder is fixed; and
    a photosensitive component fixed on the substrate and enclosed by the lens holder and the filter.

* * * * *